Dec. 2, 1969  L. A. SIEGEL  3,482,095
METHOD OF STEREOSCOPIC ILLUSTRATION OF A THREE-DIMENSIONAL
DESIGN ON A TWO-DIMENSIONAL DRAWING
Filed Feb. 25, 1966

INVENTOR.
LESTER AARON SIEGEL
BY
ATTORNEY

United States Patent Office 3,482,095
Patented Dec. 2, 1969

3,482,095
METHOD OF STEREOSCOPIC ILLUSTRATION OF A THREE-DIMENSIONAL DESIGN ON A TWO-DIMENSIONAL DRAWING
Lester Aaron Siegel, Stamford, Conn., assignor to American Cyanamid Company, Stamford, Conn., a corporation of Maine
Filed Feb. 25, 1966, Ser. No. 529,954
Int. Cl. G01n 23/04
U.S. Cl. 250—60                                    4 Claims

ABSTRACT OF THE DISCLOSURE

A stereoscopic pair of designs is printed in colorless, photoluminescent inks, one of the two stereo designs being in an ink that fluoresces in one color when illuminated by ultraviolet light and the other an ink which fluoresces in a different color. Preferably, the stereoscopic pair is superimposed on a design in invisible ink. For example, in an important field of teaching, mechanical subjects, the two-dimensional representation can be of a machine or parts thereof while the stereoscopic images are gears or other elements in the machine. Under ordinary illumination a two-dimensional representation of the machine appears and when ultraviolet light is flashed on the stereoscopically represented element fluoresces in the two different colors. If the observer is wearing a pair of glasses with different sharp cutting filters in the two lenses or views the representation through a viewer similarly equipped, the stereoscopically represented part jumps out in full three-dimensional form. It is possible to have more than one stereoscopically printed colorless design, one in a pair of inks which photoluminesce in one pair of colors and the other in the other. When there is illumination by ultraviolet light, shifting of the lenses in the spectacle or viewer first shows the three-dimensional element in one position and then in another. This is strikingly used in the teaching of mechanical subjects to show an element in two or more different positions. In the preferred use, of course, the colorless stereoscopic designs cover only a part of a larger two-dimensional colored design.

Background of the invention

In the patent application of Freeman and Halverson, Ser. No. 596,366, filed Oct. 14, 1966, which is a continuation-in-part of an earlier application, Ser. No. 437,866, filed Mar. 8, 1965, now abandoned, assigned to the assignee of the present application, there is described a method of encoding and retrieval of messages in which symbols are encoded in inks with a code of photoluminescent components which fluoresce under ultraviolet or similar short wave radiation, in different wavelength bands. More particularly, the application describes the use, as at least one of the components, of chelates of lanthanide ions which fluoresce in very narrow wavelength bands when illuminated.

Summary of the invention

In the present invention similar inks are used, however containing only one photoluminescent component whereas in the Freeman and Halverson application the inks contain either one or more than one component in accordance with the particular code. These inks are colorless, but if a drawing or other graphic representation is made with two such inks fluorescing in different wavelength bands and properly drawn and displaced, a stereoscopic representation is made possible when the designs are illuminated with ultraviolet light and examined with spectacles or stereo viewers in which the spectacle or portion of the viewer for one eye has a sharp cutting filter which lets through only the fluorescent band corresponding to the photoluminescent component used. A stereoscopic representation results, the brain of course synthesizing the three dimensional representation, which of course appears in the color corresponding to both of the fluorescent bands. Thus, for example, if one ink is characterized by a chelate of europium, which fluoresces in the red, and the other ink has a blue fluorescing photoluminescent material, such as for example 4,5-diphenylimidazolone-2, the apparent three-dimensional image will be in a shade of purple or magenta.

The present invention can be used for a number of purposes. The stereoscopic design, which appears only when illuminated with ultraviolet light, may be decorative and either be by itself or superimposed on some other picture, design or drawing. Another very useful field is in educational representations of machinery. For example, if there is a mechanical drawing which is two-dimensional, a particular part, such as a gear, cam, or other machine element, may be drawn in or printed in the two different inks. Under visible light the two-dimensional drawing of the machine is all that appears, but when the proper glasses are worn or the drawing of the machine is viewed through a suitable viewer with the different filters for the different eyes, and illuminated with ultraviolet light, the element appears in the machine in three-dimensional form. A most striking illustration for teaching purposes results, and this is an important field of utility of the present invention. The invention is not limited to the particular shape of the three-dimensional or stereoscopic drawing in the two inks, and the above fields of utility are set forth merely as typical without intending to limit the invention thereto.

As described above a single stereoscopic element is shown when ultraviolet illumination of the design is carried out.

Description of the preferred embodiments

The invention is not limited to representing a colorless stereoscopic design which appears on illumination with ultraviolet as the only design on the substrate or surface viewed, and it is possible to have more than one element drawn in stereoscopically using two different coded inks for one element and two other coded inks which fluoresce at different points in the visible spectrum for the other element. It is thus possible with one set of spectacle lenses or one set of filters in the viewer to see one element when ultraviolet illumination is used and then by using a different pair of filters corresponding to the two inks for the second element, this can be brought out. Very striking effects are possible, and for teaching purposes it is possible to show first one element and then the other. This may be the same element in different positions, which is often of importance in illustrating what happens in a machine when a particular element assumes one and then another position. Very striking results are obtained, and the scope of utility of the invention in the teaching field is thereby enhanced.

It is possible to represent more than two different elements or more than two different positions of the same element by using still a third pair of inks. When more than four inks are involved, it will normally be desirable to use only lanthanide chelates as the photoluminescent components for all of the inks, because the band of fluorescence of organic fluorescing materials, such as the diphenylimidazolone referred to as a typical illustration above, is considerably broader, and it is difficult to accommodate a larger number of different fluorescent bands within the visible spectrum with sufficient filter sharpness so that only the bands corresponding to one stereoscopic representation of a particular element or one position of an element is not confused by the fluorescence of the other element or position of the same element. The bands of fluorescence of the chelated lanthanide ions are so narrow and sharp, for the most part narrower than 100 A. or in many cases less than 50 A., that in the visible band, which is several thousand angstroms wide, the number of possible elements can be quite large, requiring of course quite sharp cutting filters in the viewer or spectacles, which however is quite simple with modern interference filters. However, there is a limit to the number of lanthanide ions. The fluorescence color is dependent on the particular lanthanide ion itself and not on the ligands which are used in making the chelate or only slightly dependent thereon. In general, the choice of ligand is dictated primarily by quantum efficiency of the photoluminescence whereas the sharp radiation band is determined by the lanthanide ion itself.

There are only a limited number of different lanthanide ions, there being only 13 of these different elements excluding the very rare promethium, and not all of these can be used readily in the present invention because some have luminescent bands in the near infrared, which is of course not visible by the human eye. Theoretically, of course, with a photoluminescent component fluorescing in the near infrared, the corresponding filter could be a screen which luminesces in the visible when receiving infrared radiation. However, this becomes quite complicated and, although not excluded from the present invention, is definitely not a preferred form. As a matter of practical operation, four different lanthanide chelates are readily available, and it is practical to use six or even eight. This represents close to the limit of the number of different stereoscopic pairs practical with the present invention. However, this limitation is not a serious one as generally a sufficient number of three-dimensional representations are possible for practical use.

Reference has been made to the fact that the brain will synthesize colors received by the two eyes. This makes it possible to produce a single stereoscopic design or element in full natural color. One of the inks can fluoresce in the blue and the corresponding filter should be used, for example the situation represented by the diphenylimidazolone fluorescer, and the other ink can be a mixture of two lanthanide ion chelates, one fluorescing in the red and the other in the green. By suitable concentration of the components it is possible to represent the three-dimensional object in different colors, using, of course, a double band pass filter in one spectacle or viewer. Theoretically it would be possible to represent an object which had a number of different colors at different parts of the object, so long as none of the colors were spectral, that is to say would be perceived only by one eye, but there is some limitation because, of course, the different inks must not be mixed in the stereoscopic drawings. This is of course no problem when the three-dimensional element is to be represented in a single color because then the two inks can be printed with the right concentrations of the particular photoluminescent materials.

Reference has been made to choice of ligands to produce high quantum efficiency. This is always desirable. However, the sensitivity of the human eye is so high that the absolute maximum of quantum efficiency is not normally needed. Nevertheless, it is desirable to use ligands which are efficient, such as some of the highly effective $\alpha,\beta$-diketones described in the Freeman and Halverson application above referred to.

Description of the preferred embodiments

Figure 1:
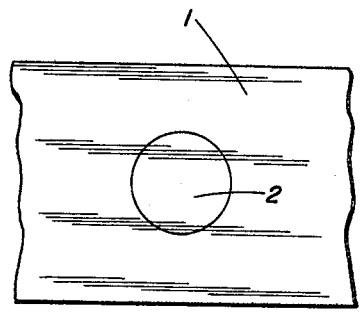
FIG. 1 is a plan view of a portion of a machine having a movable plunger, the drawing being in two-dimensional form.
Figure 2:
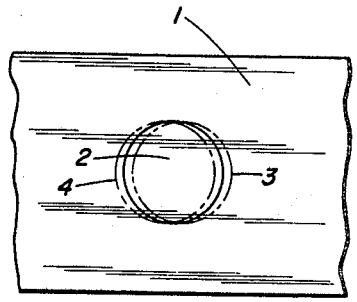
FIG. 2 is a similar plan view of FIG. 1 but shows two displaced stereoscopic images.
Figure 3:
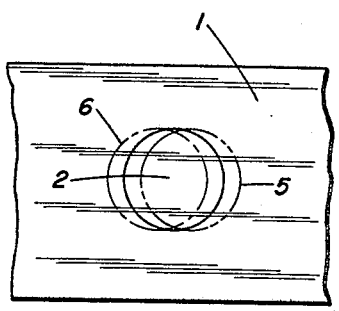
FIG. 3 is a similar plan view to FIG. 2 but shows the stereoscopic images separated to a greater degree.

Turning to the drawings, which are diagrammatic, simple illustrations of a very simple mechanical organization, FIG. 1 shows a portion of a machine 1 with a movable plunger or piston 2 in a position where the plunger is flush with the surface shown. The drawing is two-dimensional and may be in black and white or other color which can be seen under ordinary visible light. FIGS. 2 and 3 show the same portion of the machine but with superimposed stereoscopic images of the plunger shown at 3 and 4 in FIG. 2 and 5 and 6 in FIG. 3. The figures are shown separately so as not to confuse the drawings, and FIGURE 1 shows the situation under visible light where the colorless photoluminescent images do not show. FIGS. 2 and 3 can be combined with FIG. 1 so that two different positions of the plunger are shown, or either may be used alone. The photoluminescent inks for images 3 and 4 of FIG. 2 luminesce in colors different from those of the images 5 and 6 in FIG. 3, for example one pair could be red and green and the other pair different complementary colors.

Figure 4:
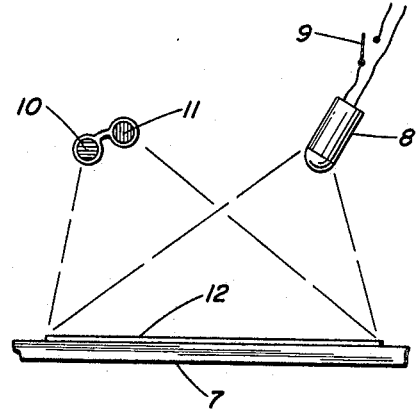
FIG. 4 is a diagrammatic representation of apparatus for viewing the drawings of FIG. 2 or FIG. 3.

FIG. 4 shows in diagrammatic form a simple viewing device with a support 7 for the illustration 12. 8 is a diagrammatic representation of an ultraviolet lamp, the light from which may be focused on the plane of the illustration 12. The light has to be turned on and off and, therefore, in FIG. 4 a switch 9 is indicated diagrammatically. The representation is viewed by the viewer with his eyes at a point shown by spectacles having two lenses 10 and 11, one lens passing photoluminescent light from one of the images and 11 from the other, the lenses of course being arranged so that the proper eye sees the proper image. A different pair of glasses or lenses can be used to bring out the stereoscopic image of FIG. 3, and so the plunger 2 can be shown in its flush position under visible light and in one or two different raised positions by ultraviolet illumination and photoluminescent stereoscopic images. Of course the lenses 10 and 11 also transmit some visible light so that the two-dimensional illustration of FIG. 1 remains visible.

The following are typical combinattions of lanthanide ion chelates and other photoluminescent material in addition to the europium and diphenylimidazolone mentioned above. A red-green stereoscopic representation can use europium chelates for one ink and terbium for the other. Of course, a mixture of europium and terbium with diphenylimidazolone for the other ink could be used for color representation. The above examples of typical chelates are illustrative only, as the present invention is not intended to be limited to any particular single chelate or pairs of chelates.

When the stereoscopic designs are only in the photoluminescent materials, which are colorless under ordinary light, a very striking effect is produced because the three-dimensional representation on ultraviolet illumination can be quite startling. It should be understood, however, that the present invention can also be utilized in connection with an ordinary stereoscopic representation. Let us assume that the photoluminescent components are chelates of europium and terbium with sharp cutting red and green filters for the two different eyes. If now a different design or a machine element in a different position is drawn in stereoscopically with red and green inks of suitable color so that their reflected radiation passes through the sharp cutting red and green filters for the two different eyes and then if the design is put in a viewing box, one button is pressed which illuminates with visible light a stereoscopic representation of one design or a machine element in one particular position is shown. Then if the illumination is switched from visible to ultraviolet, a different design or the same element in a different position now becomes visible. As the color will appear to be the same in both cases, quite a striking effect is obtained in shifting from one illumination to the other, particularly where a mechanical drawing is present with an element shown stereoscopically in one position and then in the other.

With the modification in which a mechanical drawing is provided with the one or more steroscopic representations, it may be necessary that the drawing of the machine should appear both under visible and ultraviolet illumination. This is, of course, easy, as it is only necessary that these portions of the design be printed in an ink which has both color and one of the photoluminescent components. Then the appearance will be substantially the same whether one switches from visible light illumination to ultraviolet illumination.

I claim:
1. A method of stereoscopic illustration which comprises,
   (a) producing a two-dimensional drawing in colors visible under visible light illumination,
   (b) superimposing stereoscopic drawings in two inks, colorless under visible light, one containing one photoluminescent material and the other another, and
   (c) illuminating the design with short wave radiation and observing it binocularly with different filters for the different eyes corresponding to the bands of fluorescence of the two inks, whereby when illuminated with short wave radiation a three-dimensioned design appears on the two-dimensional design.

2. A method according to claim 1 in which the design appearing in the visible is a two-dimensional representation of a machine and the fluorescent three-dimensional design on short wave illumination shows the three-dimensional design as a machine element in the two-dimensional machine.

3. A method according to claim 2 in which the three-dimensional machine element is represented in at least two different positions, each three-dimensioning being with a pair of different inks and observation being successively through a plurality of pairs of filters corresponding to the fluorescent bands.

4. A method according to claim 2 in which a stereoscopic representation of the machine element in one position is made with colored inks reflecting visible light in the same general wavelength regions as the two fluorescent inks fluoresce and observation is first by visible light, which shows the three dimensional element in one position, and then by ultraviolet light showing it in another.

References Cited

UNITED STATES PATENTS

| | | |
|---|---|---|
| 1,285,753 | 11/1918 | Lowenstein. |
| 2,386,418 | 10/1945 | Armbrust _____ 350—132 |
| 2,594,903 | 4/1952 | Freedman et al. _____ 250—71 |

RALPH G. NILSON, Primary Examiner

A. L. BIRCH, Assistant Examiner

U.S. Cl. X.R.

35—8, 13; 250—71; 350—132